E. G. DODGE.
PROCESS OF MAKING BATTERY PLATES.
APPLICATION FILED NOV. 4, 1911.
1,035,326.
Patented Aug. 13, 1912.
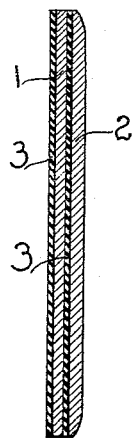
WITNESSES
INVENTOR
EBEN·G·DODGE
BY
ATTORNEYS

UNITED STATES PATENT OFFICE.

EBEN G. DODGE, OF SOUTH ORANGE, NEW JERSEY.

PROCESS OF MAKING BATTERY-PLATES.

1,035,326. Specification of Letters Patent. Patented Aug. 13, 1912.

Original application filed December 26, 1908, Serial No. 469,240. Renewed November 4, 1911, Serial No. 658,617. Divided and this application filed November 4, 1911. Serial No. 658,467.

*To all whom it may concern:*

Be it known that I, EBEN G. DODGE, a citizen of the United States, and a resident of South Orange, in the county of Essex and State of New Jersey, have invented certain new and useful Improvements in a Process of Making Battery-Plates, of which the following is a specification.

My invention relates to the method of manufacturing the battery plate of an electric battery and particularly battery plates for primary batteries.

My invention is particularly useful in manufacturing battery plates comprising a compressed mass of metallic depolarizing material such for instance as copper or other oxid and provided with a backing or reinforcement consisting of metal to which the mass of oxid is united by enamel upon the surface of the metal.

Briefly stated, the invention consists in compressing a mass of the copper oxid or other substance rendered plastic by any suitable liquid, upon the metal backing having a coating of enamel, and then firing the two at a suitable temperature to at once consolidate or harden the mass of depolarizing material, as is usual in manufacturing copper oxid plates for primary batteries, and to also fuse and soften the enamel so that on cooling, said enamel will firmly cement or unite the oxid and the support to one another as a practically integral structure of the kind described and claimed in my prior application for patent filed December 26th, 1908, Serial Number 469,240.

In practising the invention, the compression of the plastic mass of depolarizing material upon the metal backing is preferably done in a mold which may be a mold of the general form or dimensions employed in making copper oxid plates constructed as heretofore has been the practice, without any backing or reinforcement.

In the accompanying drawings I show in vertical central section a portion of a battery plate comprising a metal backing and metal oxid made according to the method constituting my present invention.

1 indicates the support plate or reinforcement which is preferably imperforate and flat upon its surface, although my invention is applicable also to the construction of battery plates in which the support or backing is corrugated or otherwise formed in a manner to assist in holding the element or material applied to its face. The part 1 shown as a plate is to be taken as typical of any reinforcement, whether imperforate or reticulated or provided with openings.

2 is the mass of copper or other oxid and 3 is a coating of enamel shown exaggerated in thickness upon the surface of the plate or reinforcement 1 and serving as the means for firmly uniting the material 2 with its backing.

To construct the battery plate I take a plate or other form of metal reinforcement for the oxid and provide same with a coating of enamel. For convenience in practising the invention a plate of sheet metal having an enameled surface such as the ordinary enameled metalware of commerce, may be employed. A quantity of copper oxid or other depolarizing substance entering into the battery is made plastic, as usual in the art, by mixing with a suitable quantity of alkaline water, as for instance a solution of caustic soda, and is spread upon the enameled surface of the backing to the necessary or desired thickness, and is then compressed upon the backing preferably in a mold, whereby it may be prevented from spreading and may take the desired shape in outline. This compressing is done in the usual manner employed in compressing the copper oxid of battery plates composed wholly of oxid to form and consolidate the same preparatory to firing after the manner ordinarily practised in the art. After compression upon the surface of the backing, thereby bringing the mass of depolarizing material while in plastic condition into intimate contact with the enamel, the two are then placed in a furnace and fired or baked at the temperature usually employed in hardening copper oxid plates, and at a sufficiently high temperature to fuse and soften the enamel upon the surface of the backing, so that on cooling, the enamel will firmly cement or unite the oxid and support or reinforcement together, and the mass of copper oxid will have its particles locked together in a consolidated or hardened mass, as in the ordinary copper oxid plate.

No attempt is made in the drawing to show the manner of making electrical connection with the mass of copper oxid for the purpose of drawing off current, as the means for this purpose may be the usual or any proper means employed in the art as to be well understood by those skilled therein.

The term "enamel", as used herein, is to be understood as covering any coating which will fuse when the backing or reinforcement and the active material spread and compressed thereon are fired and will serve as a bond to join the reinforcement and the active material.

The article herein described, to wit: the battery element comprising the enameled backing and the metallic oxid compressed upon and united with the backing by the enameled surface thereof is not herein claimed as it forms the subject of claims in my prior application, filed December 26th, 1908, Serial No. 469,240 allowed August 31st 1910 and renewed November 4th 1911, Serial No. 658,617, of which this case is a divisional application.

What I claim as my invention is:

1. The method of manufacturing a battery plate comprising a depolarizing material and a reinforcement therefor consisting in providing the reinforcement with an enameled surface, compressing a plastic mass of the depolarizing material upon the reinforcement and then firing the two so as to harden said material and at the same time unite it with its reinforcement by the enamel of the latter.

2. The method of constructing a battery element comprising a hardened mass of metallic oxid having a metal backing consisting in compressing a plastic mass of the oxid upon the enameled surface of the backing and then firing the two to harden the metallic oxid and at the same time to unite it with the backing by the enamel.

3. The herein described method of manufacturing a battery plate consisting of a metal-backed mass of copper oxid consisting in providing a metallic backing with an enameled surface, compressing a plastic mass of the copper oxid upon said enameled surface and then firing to harden the copper oxid and unite it with the metal backing by fusing the enamel.

Signed at New York in the county of New York and State of New York this 3rd day of November A. D. 1911.

EBEN G. DODGE.

Witnesses:
F. B. TOWNSEND,
M. A. PORTER.

---

Copies of this patent may be obtained for five cents each, by addressing the "Commissioner of Patents, Washington, D. C."